(12) United States Patent
West et al.

(10) Patent No.: US 12,494,572 B2
(45) Date of Patent: Dec. 9, 2025

(54) RAPID-DEPLOYMENT REFLECTARRAY ARCHITECTURE FOR MOBILE SATELLITE COMMUNICATION (SATCOM) OPERATIONS

(71) Applicant: Rockwell Collins, Inc., Cedar Rapids, IA (US)

(72) Inventors: James B. West, Cedar Rapids, IA (US); Jiwon L Moran, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 24 days.

(21) Appl. No.: 18/545,441

(22) Filed: Dec. 19, 2023

(65) Prior Publication Data
US 2025/0202104 A1   Jun. 19, 2025

(51) Int. Cl.
*H01Q 1/28*    (2006.01)
*H01Q 3/12*    (2006.01)
(Continued)

(52) U.S. Cl.
CPC ............... *H01Q 3/12* (2013.01); *H01Q 3/34* (2013.01); *H01Q 21/061* (2013.01)

(58) Field of Classification Search
CPC .......... H01Q 11/08; H01Q 1/38; H01Q 13/02; H01Q 13/0225; H01Q 21/08
See application file for complete search history.

(56) References Cited

U.S. PATENT DOCUMENTS

| 4,684,952 A | * | 8/1987 | Munson | H01Q 21/065 |
| | | | | 342/368 |
| 5,515,065 A | * | 5/1996 | Sherwood | H01Q 1/3275 |
| | | | | 343/882 |

(Continued)

FOREIGN PATENT DOCUMENTS

| CN | 104009297 A | 8/2014 |
| CN | 103682651 B1 | 3/2017 |

(Continued)

OTHER PUBLICATIONS

David M. Pozar et al. "Design of millimeter wave microstrip reflectarrays" IEEE Transactions on Antennas and Propagation (vol. 45, Issue 2, pp. 287-296 Feb. 1997; https://ieeexplore.ieee.org/stamp/stamp.jsp?tp=&arnumber=560348 (Oct. 31, 2023).

*Primary Examiner* — David E Lotter
(74) *Attorney, Agent, or Firm* — Suiter Swantz IP

(57) ABSTRACT

A rapid-deployment satellite communications (satcom) terminal apparatus includes a base capable of rotation relative to a platform (e.g., a mobile platform or trailer to which the apparatus may be mounted or from which it may be detached), and a passive planar array panel comprising an array of antenna elements or apertures, the passive planar array panel pivotably and slidably attached to the base. The passive planar array panel includes a feed arm and feed antenna, the arm articulable relative to the panel and the antenna articulable relative to the arm. The feed antenna transmits and/or receives EM energy focused by the antenna elements in a beam direction adjustable by an array controller to a desired azimuth and elevation via electromechanical adjustment of, respectively, the rotational orientation of the base and the slant angle of the passive planar array panel relative to the platform.

19 Claims, 7 Drawing Sheets

(51) Int. Cl.
*H01Q 3/34* (2006.01)
*H01Q 21/06* (2006.01)

(56) References Cited

U.S. PATENT DOCUMENTS

| | | | |
|---|---|---|---|
| 5,619,215 | A | 4/1997 | Sydor |
| 6,774,851 | B1 | 8/2004 | Cuhaci et al. |
| 8,334,809 | B2 | 12/2012 | Nichols et al. |
| 8,451,165 | B2 | 5/2013 | Puzella et al. |
| 9,048,544 | B2 | 6/2015 | Georgiadis et al. |
| 9,621,850 | B1 | 4/2017 | Mitchell |
| 9,711,850 | B2 | 7/2017 | Naym et al. |
| 10,276,926 | B2 | 4/2019 | Cwik et al. |
| 10,833,404 | B1 | 11/2020 | Kaddour et al. |
| 10,938,105 | B2 | 3/2021 | Snyder et al. |
| 11,575,214 | B2 | 2/2023 | Hand et al. |
| 2009/0180421 | A1 | 7/2009 | Hall et al. |
| 2012/0249366 | A1 | 10/2012 | Pozgay et al. |
| 2015/0102973 | A1* | 4/2015 | Hand .................. H01Q 21/26 343/837 |
| 2017/0110803 | A1 | 4/2017 | Hodges et al. |
| 2021/0249778 | A1 | 8/2021 | Achour et al. |
| 2022/0239007 | A1 | 7/2022 | Biswas |
| 2022/0285859 | A1 | 9/2022 | Biswas et al. |
| 2023/0223684 | A1 | 7/2023 | Turpin et al. |
| 2023/0327754 | A1 | 10/2023 | Billman et al. |

FOREIGN PATENT DOCUMENTS

| | | |
|---|---|---|
| EP | 0687389 B1 | 9/1998 |
| EP | 1919029 A3 | 5/2008 |
| EP | 3750211 A4 | 12/2020 |
| EP | 4096117 A1 | 11/2022 |
| EP | 4120585 A1 | 1/2023 |
| IL | 69745 A | 8/1987 |
| IN | 202141041836 A | 11/2021 |
| WO | 2023148474 A1 | 8/2023 |

* cited by examiner

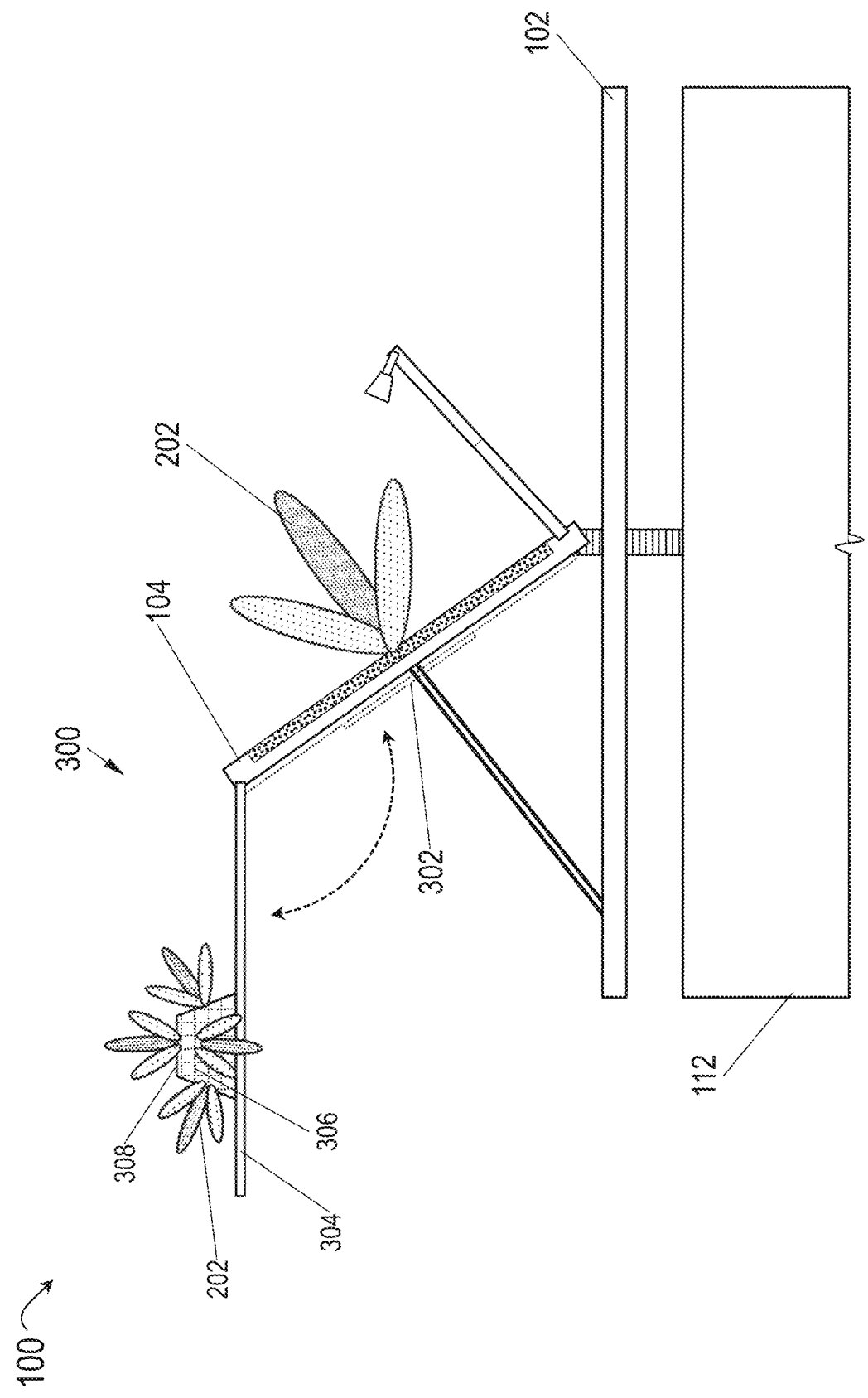

RAPID-DEPLOYMENT REFLECTARRAY ARCHITECTURE FOR MOBILE SATELLITE COMMUNICATION (SATCOM) OPERATIONS

CROSS-REFERENCE TO RELATED APPLICATIONS

The present application is related to, and incorporates herein by reference in its entirety, the concurrently filed U.S. Patent Application entitled RAPID-DEPLOYMENT HEMISPHERICAL ACTIVE ELECTRONICALLY SCANNED ARRAY FOR MOBILE SATELLITE COMMUNICATION OPERATIONS and having Ser. No. 18/545,390.

BACKGROUND

Conventional terminals for satellite-based tactical communications (satcom; including low earth orbit (LEO), middle earth orbit (MEO) and/or geosynchronous orbit (GEO) satellites and/or constellations thereof) are heavy, cumbersome apparatus that require significant amounts of time (c. 30 minutes) to assemble and acquire satellite connectivity, both of which are problematic in a war theater where mobility, speed, and undetectability are all essential. Prior attempts to solve this problem, e.g., Cubic's Ground-to-Air Transmit and Receive (GATR) satellite antenna system is likewise heavy, cumbersome, and effective only for stationary comms-on-the-halt (COTH) operations (also comms-on-the-pause (COTP), e.g., as opposed to mobile comms-on-the-move (COTM) operations) with GEO satellites only, leaving the apparatus both vulnerable to attack and limited in scope. Further, the inflatable radome requires time to inflate and may be vulnerable to wind loading issues, requiring a power-hungry motion control system to maintain a satellite link with narrow bandwidth antennas.

SUMMARY

In an aspect, a rapid-deployment satellite communications (satcom) terminal apparatus is disclosed. In embodiments, satcom terminal apparatus includes a base rotatable relative to a platform (e.g., a mobile platform to which the apparatus may be attached and/or detached) and a passive planar array panel pivotably attached to the base, the passive planar array panel comprising an array of antenna elements or apertures. The passive planar array panel may be pivoted to a desired slant angle relative to the base (e.g., via a lead screw) and includes a feed arm and feed antenna, the feed arm articulable relative to the passive planar array panel and the feed antenna articulable relative to the feed arm. The feed antenna is configured for transmission and/or reception of electromagnetic (EM) energy focused by the antenna elements in a desired beam direction. The satcom terminal apparatus includes an array controller capable of electromechanical or manual adjustment of the beam direction for satcom operations by controlling the slant angle of the passive planar array panel (e.g., to a desired elevation) and the rotational orientation of the base (e.g., to a desired azimuth) relative to the platform.

In some embodiments, the array controller adjusts the beam direction by adjusting the orientation of the feed arm relative to the passive planar array panel and/or the orientation of the feed antenna relative to the feed arm.

In some embodiments, the passive planar array panel is a reflectarray panel comprising, e.g., a concentric array of reflectarray elements or cells.

In some embodiments, the satcom terminal apparatus is configured for half-duplex transmission and reception of EM energy via the passive planar array panel.

In some embodiments, the satcom terminal apparatus is configured for full-duplex transmission and reception of EM energy via the passive planar array panel.

In some embodiments, the satcom terminal apparatus includes a protective cover deployable (e.g., electromechanically, via the array controller) to cover the passive planar array panel when the passive planar array panel is stowed flat or otherwise not in use.

In some embodiments, the passive planar array panel is attached to the base by a bottom edge, and further includes an upper base rotatably or pivotably attached to its top edge. A deployable active electronically scanned array (AESA) is attached to the upper base, the AESA including a set of side AESA subarray panels and an apex AESA subarray panel, each subarray panel including a set of AESA antenna elements or apertures. Each AESA subarray panel is capable of electronically steerable (e.g., via the array controller) transmission and reception of EM energy at a desired frequency, polarization, etc. as selectable by the array controller. The AESA has a retracted configuration (e.g., folded into a rear face of the passive planar array panel), a stowed configuration (e.g., wherein the upper base is deployed and the apex and side AESA panels are disposed substantially coplanar to the upper base), and a deployed configuration (e.g., wherein the AESA side panels are pivoted to a desired slant angle relative to the upper base, such that the AESA apex and side panels form a truncated pyramid).

In some embodiments, signal frequency, signal polarization, beam steering, and other attributes for each AESA subarray are selectable and controllable via the array controller. Further, the array controller selects a desired slant angle for each side AESA panel and transitions the AESA between retracted, stowed, and deployed configurations.

In some embodiments, each AESA side subarray panel is pivoted at a common slant angle relative to the upper base.

In some embodiments, the AESA apex subarray panel comprises a set of panel segments, each panel segment operable as an AESA subarray and attached to a central lead screw such that the panel segments may collectively be configurable as a pyramid (e.g., at a slant angle identical to or different from the side AESA panels) or as an inverted pyramid by rotation of the lead screw in a clockwise or counterclockwise direction.

In some embodiments, the array controller is configured for electromechanical configuration or reconfiguration of the AESA apex panel segments.

In some embodiments, the AESA includes AESA base subarray panels, each base panel fixed to the upper base between two adjacent side panels and likewise configured (e.g., via an array of AESA elements or apertures) for electronically steerable and attribute-selectable transmission and reception (although, for example, the base panels remain fixed to the upper base regardless of the slant angle of the side panels relative thereto).

In some embodiments, the upper base includes a gap between each AESA base subarray panel and its two adjacent AESA side subarray panels.

In some embodiments, the upper base (and thus the AESA array) is pivotably attached to the passive planar array panel relative to a first rotational axis) but is also capable of pivoting (e.g., as electromechanically directed by the array controller) relative to a second rotational axis normal to the first rotational axis.

In some embodiments, the platform to which the satcom terminal apparatus is attached (e.g., via the base) includes a mobile platform, e.g., a ground-based vehicle or towable trailer.

In some embodiments, the satcom terminal apparatus is detachable from the mobile platform (e.g., via a detachable pallet) such that the passive planar array panel and array controller are configurable for satcom operations when detached (e.g., on level ground).

In some embodiments, the satcom terminal apparatus is carried by a single footsoldier, e.g., as a set of components transportable in a backpack by a footsoldier remotely located from any mobile platform or ground base. The footsoldier likewise carries an array controller for providing control input to the assembled satcom terminal apparatus.

In some embodiments, components of the satcom terminal apparatus (e.g., the feed arm, feed antenna, base, passive planar array panel) are transportable by the footsoldier in a disassembled state and capable of assembly (e.g., for satcom operations) and disassembly (e.g., for transport) by the footsoldier.

In some embodiments, the passive planar array panel or components thereof (e.g., planar array elements, feed arm, feed antenna) may be at least partially protected via one or more planar superstrates fashioned of dielectric ballistic materials.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 3 is a profile view of the satcom terminal apparatus of FIG. 1 incorporating a deployable hemispheric active electronically scanned array (AESA) assembly according to example embodiments of this disclosure;

DETAILED DESCRIPTION

Figure 1:
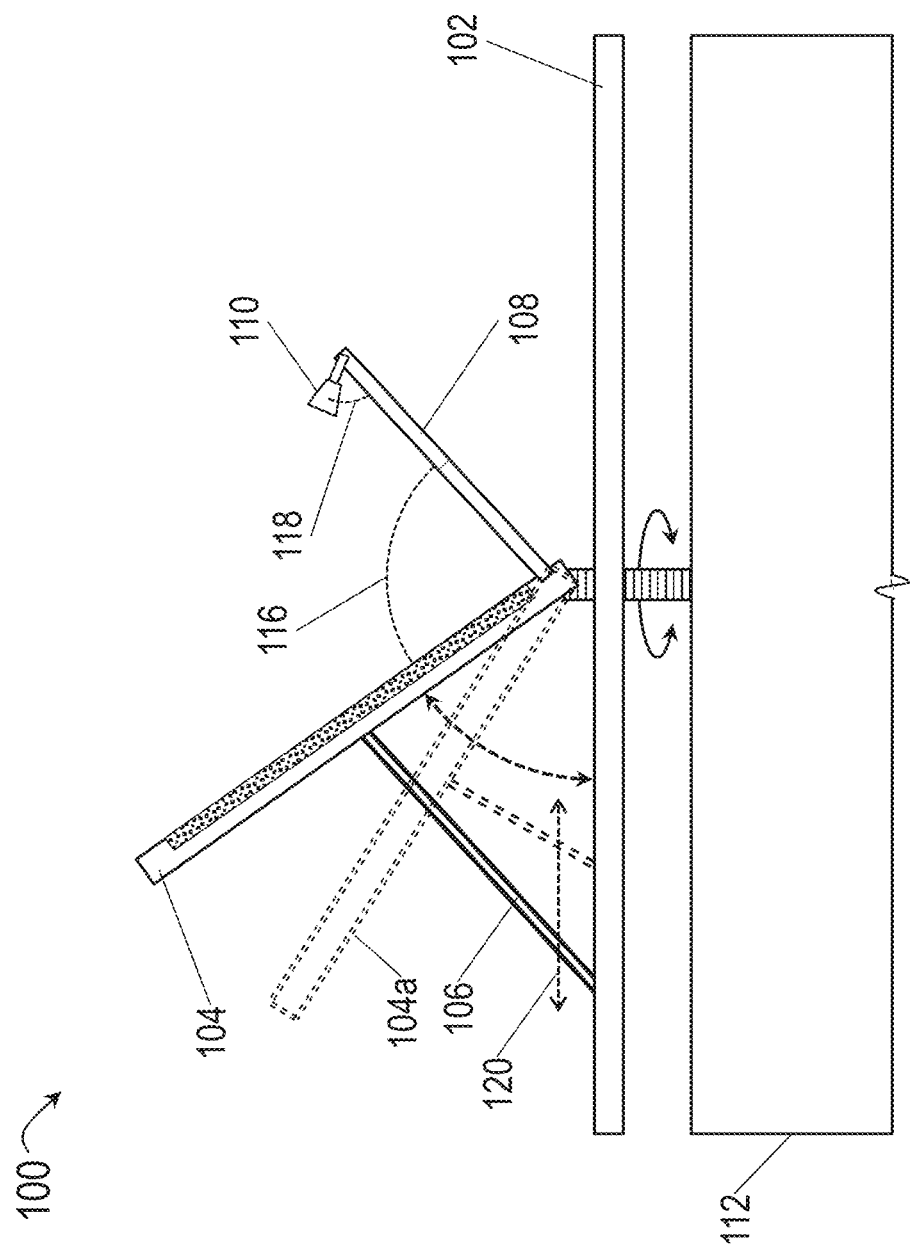
FIG. 1 is a profile view of a rapid-deployment satellite communications (satcom) terminal apparatus according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Figure 2:
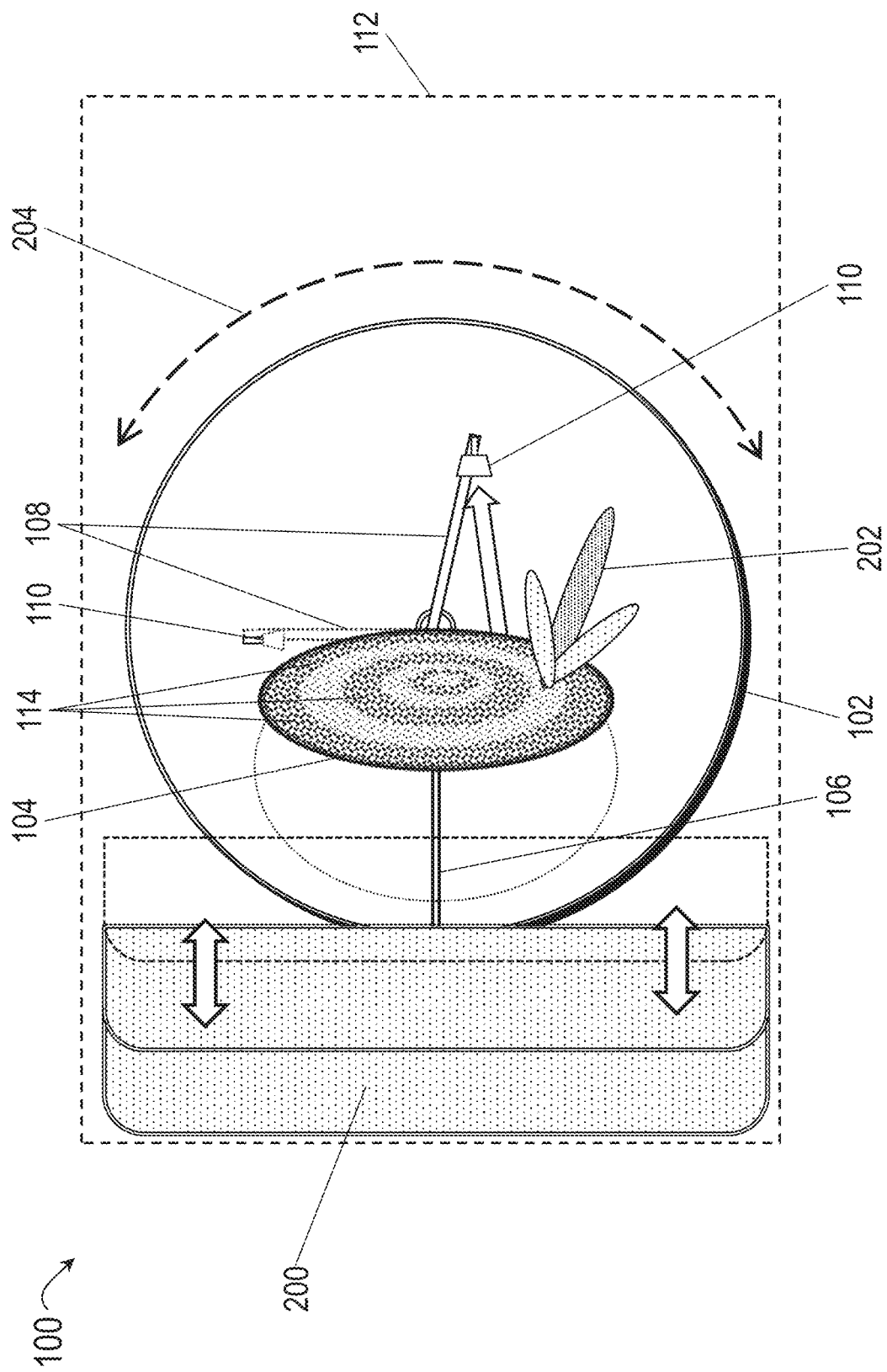
FIG. 2 is an overhead view of the satcom terminal apparatus of FIG. 1.

FIGS. 1 and 2—Satcom Terminal Apparatus, Overview

Broadly speaking, embodiments of the inventive concepts disclosed herein are directed to a satellite communications (satcom) terminal apparatus configured for rapid deployment to comms on the pause (COTP) or comms on the halt (COTH) satcom operations. For example, the satcom terminal apparatus may be transported aboard a trailer, mobile platform, or other like warfighter as with conventional satcom terminals, but may be configurable for operations with geosynchronous earth orbit (GEO) or mid-earth orbit (MEO) satcom providers (and for simultaneous operation with multiple satellite constellations) within no more than a few minutes of arrival, eliminating the need for unpacking and reassembly of terminal components (e.g., inflatable radomes, multiple carrying cases) when a desired location is reached. Further, the satcom terminal provides a significant reduction in complexity as opposed to conventional approaches, and may even be scaled down for portable manpack/foot soldier deployment via a "snap-together" modular antenna configuration as CONOPS demand.

Referring now to FIG. 1, a satellite communications (satcom) terminal apparatus 100 is shown. The satcom terminal apparatus 100 may include a base 102, passive planar array panel 104, panel lead screw 106, feed arm 108, and feed antenna 110.

In embodiments, the satcom terminal apparatus 100 may be mounted to a platform 112 via the base 102. For example, the platform 112 may be a trailer, ground vehicle, warfighter, or other mobile platform as discussed below to which the base 102 may be rotatably mounted, e.g., via lead screw or other mechanical means allowing the base to rotate relative to the platform. In embodiments, the base 102 may be capable of rotation through a full 360 degrees relative to a vertical axis or z-axis. For example, the base 102 may be manually rotated or electromechanically rotated (e.g., via an array controller as described below) to achieve a desired azimuthal angle for transmission or reception (Tx/Rx) of electromagnetic (EM) energy via the passive planar array panel 104.

In embodiments, the passive planar array panel 104 may be pivotably attached to the base 102. For example, referring also to FIG. 2, the passive planar array panel 104 may have a generally circular, elliptical, or polygonal shape, with a lower parallel edge fixed to, or proximate to, the base 102. In embodiments, the passive planar array panel 104 may be stowed flat, or substantially coplanar with the base 102, while the platform 112 is in motion. For example, the platform 112 may incorporate a deployable/retractable cover 200, e.g., comprising a series of segments or a one-piece cover deployable to cover the platform array panel 104 (or the satcom terminal apparatus 100 as a whole) when the platform 112 is in motion and retractable once the platform is no longer in motion and the satcom terminal apparatus is configured for operations. The cover 200 may provide environmental protection to, and prevent detection of, the satcom terminal apparatus 100 in general and the passive planar array panel 104 in particular. In embodiments, the cover 200 may be deployed and retracted (e.g., opened and closed) electromechanically via the array controller, or manually via an operator.

In embodiments, the passive planar array panel 104 may incorporate a feed arm 108 and feed antenna 110, the feed arm pivotably attached to the planar array panel at one end and the feed antenna mounted at its other end. For example, the feed arm 108 may be stowed with the passive planar array panel 104 and deployed via manual or electromechanical rotation to a desired angle or orientation relative to the planar array panel; similarly, the feed antenna 110 may be deployed via electromechanical rotation to a desired orientation relative to the feed arm 108.

In embodiments, the passive planar array panel 104 may be a passive reflectarray panel comprising one or more arrays (e.g., concentric arrays) of individual reflectarray elements 114 (e.g., facets, apertures, cells). For example, EM energy 202 of a target frequency, frequency band, and/or signal polarization may be transmitted or received by the feed antenna 110 and reflected by the passive planar array panel 104, the EM energy 202 collectively focused according to a desired beam direction by the reflectarray elements 114 in conjunction with the elevational angle of the planar array panel (e.g., as adjusted by the panel lead screw 106) and the azimuthal angle of the planar array panel (e.g., as adjusted by rotation of the base 102). In embodiments, the focal point to aperture diameter (f/d) for the passive planar array panel 104 may be electromechanically reconfigurable (e.g., as a function of frequency band) via adjustment or articulation of one or more of 1) the orientation 116 of the feed arm 108 relative to the passive planar array panel 104 or 2) the orientation 118 of the feed antenna 110 relative to the feed arm.

In some embodiments, the passive planar array panel 104 may comprise a concentric array of polygonal ultra wide band (UWB) radiating elements, transmitting and receiving anywhere within the C-band to Ka-band range (e.g., 3.7/4 GHz to 40 GHz). Further, RF signals transmitted or received by the satcom terminal apparatus 100 may be arbitrarily polarized via horizontal and vertical RF polarization channels; some circular polarization may also be possible. In some embodiments, final-stage low noise amplifiers (LNA; e.g., for optimal gain to noise temperature (G/T) performance), power amplifiers (e.g., for Tx-side effective isotropic radiating power (EIRP)), or other appropriate amplifiers may be integrated into the feed antenna 110. In some embodiments, the satcom terminal apparatus 100 may be configured for either half-duplex or full-duplex transmission and reception of EM energy 202.

In embodiments, the satcom terminal apparatus 100 may assist in achieving a desired elevation and azimuth for GEO or MEO satcom operations via articulation of the passive planar array panel 104 relative to the base 102 and/or rotation of the base relative to the platform 112. For example, the passive planar array panel 104 may be pivotably attached to the base 102 at a bottom edge via the panel lead screw 106, such that engagement of the panel lead screw in one direction (e.g., clockwise rotation, forward tracking relative to the base) may tilt the top edge of the planar array panel away from the base (e.g., decreasing the elevation angle of the reflectarray elements 114 in the forward face of the passive planar array panel relative to the base). Similarly, engagement of the panel lead screw 106 in the other direction (e.g., counterclockwise rotation, reverse tracking along the base) may tilt the top edge of the passive planar array panel 104 toward the base, increasing the elevation angle of the passive planar array panel. Additionally or alternatively, and as noted above, the panel lead screw 106 may track (120) forward or backward along a track relative to the base 102, tilting (104a) the passive planar array panel forward or backward to the desired elevation angle. Similarly, by rotating (204) the passive planar array panel 104 (via the base 102) relative to the platform, the azimuthal angle of the EM energy 202 may be adjusted. In embodiments, the feed arm 108 and feed antenna 110 may tilt or rotate with the passive planar array panel 104 as they are incorporated thereinto.

In embodiments, the satcom terminal apparatus 100 may be configured for GEO/MEO operations within, e.g., two minutes or less once the platform 112 is no longer in motion. For example, the cover 200 may be retracted or removed (if in use), the passive planar array panel 104 may be tilted and/or rotated to the desired elevation and azimuth, and the feed arm 108 and feed antenna 110 may be deployed and articulated to the desired orientation for Tx/Rx or scanning operations to commence (e.g., via link establishment to one or more GEO/MEO satellites, constellations, and/or providers).

FIG. 3—Deployable AESA

Referring now to FIG. 3, the satcom terminal apparatus 100 may be further configured for unobstructed MEO/LEO operations across a variety of CONOPS by incorporating a deployable active electronically scanned array 300 (AESA).

In embodiments, the deployable AESA 300 may have a retracted configuration 302 wherein the deployable AESA is incorporated into a rear face of the passive planar array panel 104, e.g., opposite the reflectarray elements 114. For example, the deployable AESA 300 may include an upper base 304, e.g., a flat surface similar to the base 102, pivotably attached to the passive planar array panel 104 such that the upper base 304 (and other components of the deployable AESA attached thereto) may be electromechanically transitioned from the retracted configuration 302 to a stowed configuration. In embodiments, the upper base 304 may be fashioned as to provide a gap or space between the deployable AESA 300 and the passive planar array panel 104, and thereby alleviate or eliminate interference between the two arrays. For example, the deployable AESA 300 may allow for multiple-frequency applications whereby the AESA 300 and passive planar array panel 104 operate at different frequencies. Additionally or alternatively, the deployable AESA 300 may be implemented for transmission of EM energy 202 while the passive planar array panel 104 is implemented for reception (or vice versa, e.g., the passive planar array panel may transmit while the deployable AESA receives). Further still, the satcom terminal apparatus 100 may be implemented for flexible mixed-provider beamforming operations whereby, for example, the deployable AESA 300 provides fast beam scan Tx/Rx with LEO satellites while the passive planar array panel 104 provides high-gain tracking of fixed GEO or high-orbit/slow MEO satellites.

Figure 4A:
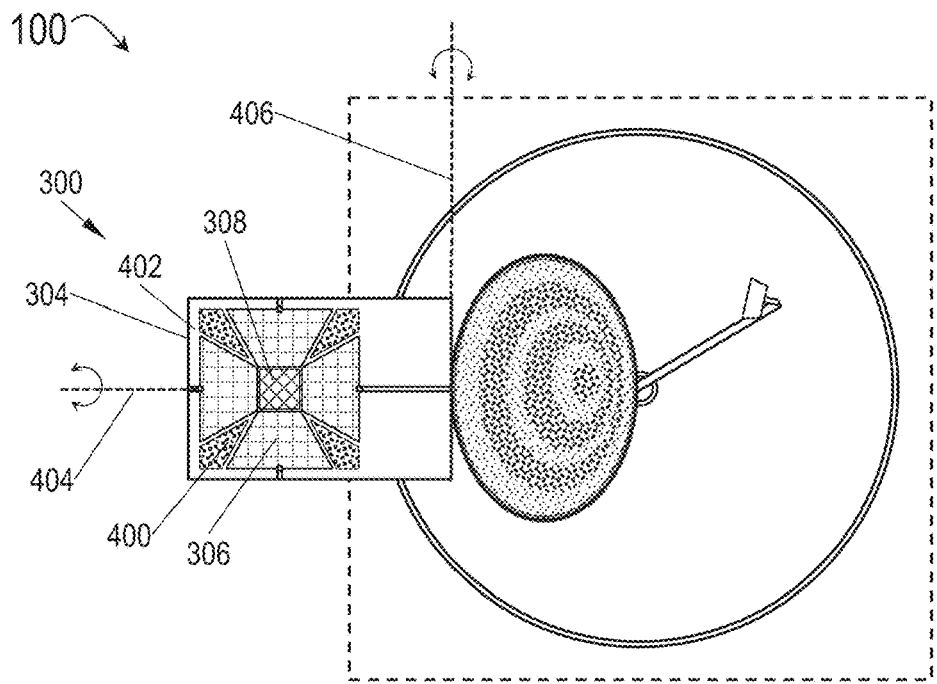
FIGS. 4A and 4B are overhead views of the satcom terminal apparatus of FIG. 6 wherein the AESA assembly is respectively in a stowed and a deployed configuration.
Figure 4B:
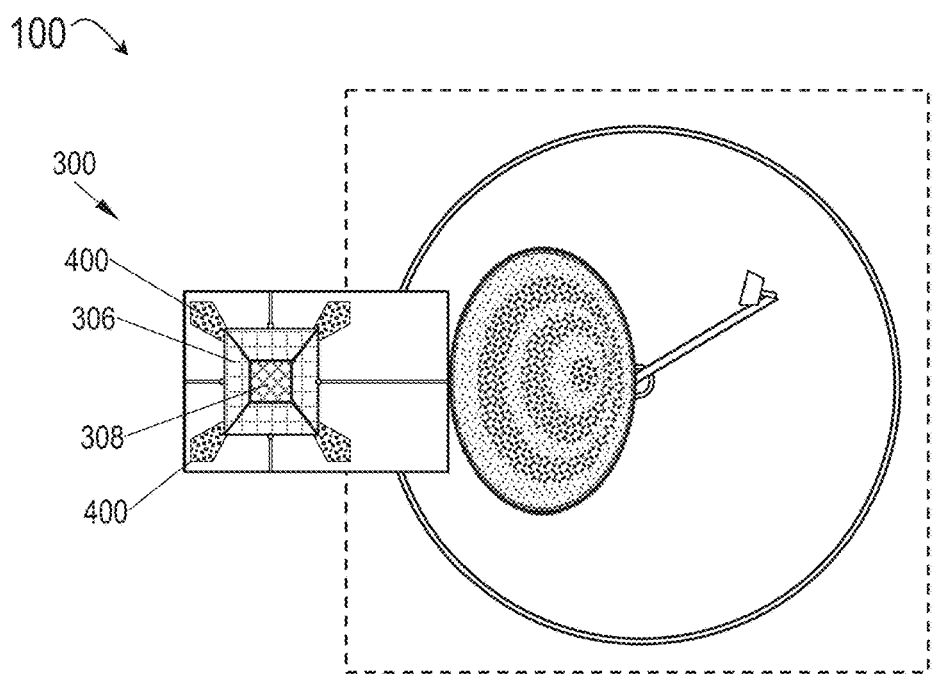

In embodiments, the deployable AESA 300 may be implemented and may function substantially as disclosed in related concurrently filed patent application Ser. No. 18/545,390, which application is herein incorporated by reference in its entirety as noted above. For example, when the deployable AESA 300 is in the stowed configuration, the upper base 304 may be maintained in a horizontal position above and substantially coplanar with the base 102. In embodiments, the deployable AESA 300 may include a set of side AESA subarray panels 306 slidably attached to the upper base 304, and an apex AESA subarray panel 308 pivotably attached to the side AESA panels, e.g., by the upper edges of the side AESA panels. For example, the side AESA panels 306 may be trapezoidal in shape, and the apex AESA panel 308 polygonal in shape (e.g., N-sided polygonal, where N is the number of side AESA panels). In embodiments, the side AESA panels 306 and apex AESA panel 308 may be substantially coplanar when the deployable AESA is in the stowed configuration (as also shown by FIGS. 4A and 4B below). In embodiments, the deployable AESA 300 may also be configured for GEO or MEO scanning when in the stowed configuration. For example, each of the apex AESA panel 308 and the side AESA panels 306 may comprise an array of AESA elements electronically steerable to focus transmitted and/or received EM energy 202 in a desired direction.

In embodiments, the deployable AESA 300 may be electromechanically transitioned from the stowed configuration to a deployed configuration as shown by FIG. 3. For example, the side AESA panels 306 and apex AESA panel 308 may be articulated into a truncated pyramid for MEO or LEO operations throughout a substantially hemispherical field of view. In embodiments, the positioning of the deployable AESA 300 proximate to the rear face of the passive planar array panel 104 may prevent line of sight (LoS) blockage of MEO/LEO operations (via the AESA) by simultaneous GEO operations via the larger-aperture planar array panel (regardless of the rotational orientation of the satcom terminal apparatus 100 relative to the platform 112).

FIGS. 4A and 4B—AESA Base Panels

Referring now to FIGS. 4A and 4B, the satcom terminal apparatus 100 is shown with the deployable AESA 300 in respectively the stowed configuration and a deployed configuration (as also shown by FIG. 3).

In embodiments, the deployable AESA 300 may include base AESA panels 400 set into the upper base 304, each base AESA panel disposed between two adjacent side AESA panels 306. For example, each base AESA panel 400 may comprise an additional subarray of AESA elements, such that the base AESA panels may enhance GEO and MEO operations when the deployable AESA 300 is in the stowed configuration shown by FIG. 4A (e.g., coplanar with the side AESA panels 306 and apex AESA panel 308). Further, when the deployable AESA 300 is transitioned into the deployed configuration (e.g., the truncated pyramid shown by FIGS. 3 and 4B) the base AESA panels 400 may continue to operate. In some embodiments, the deployable AESA 300 may incorporate mechanical gaps 402 between each base AESA panel 400 and its adjacent side AESA panels 306, e.g., to alleviate interference with the operation of the side AESA panels when the deployable AESA is in the deployed/truncated-pyramid configuration. In some embodiments, the deployable AESA may be pivotably attached to the passive planar array panel 104 in two dimensions. For example, after pivoting from the retracted configuration into the stowed or deployed configurations, the deployable AESA 300 may further be pivotable relative to a roll axis 404, e.g., for further enlargement of the hemispherical field of view for MEO/LEO operations. In embodiments, the deployable AESA 300 may pivot between the retracted configuration (302, FIG. 3) and the stowed configuration shown by FIGS. 3 and 4A according to a pivot axis 406, the roll axis 404 normal to the pivot axis.

Figure 5:
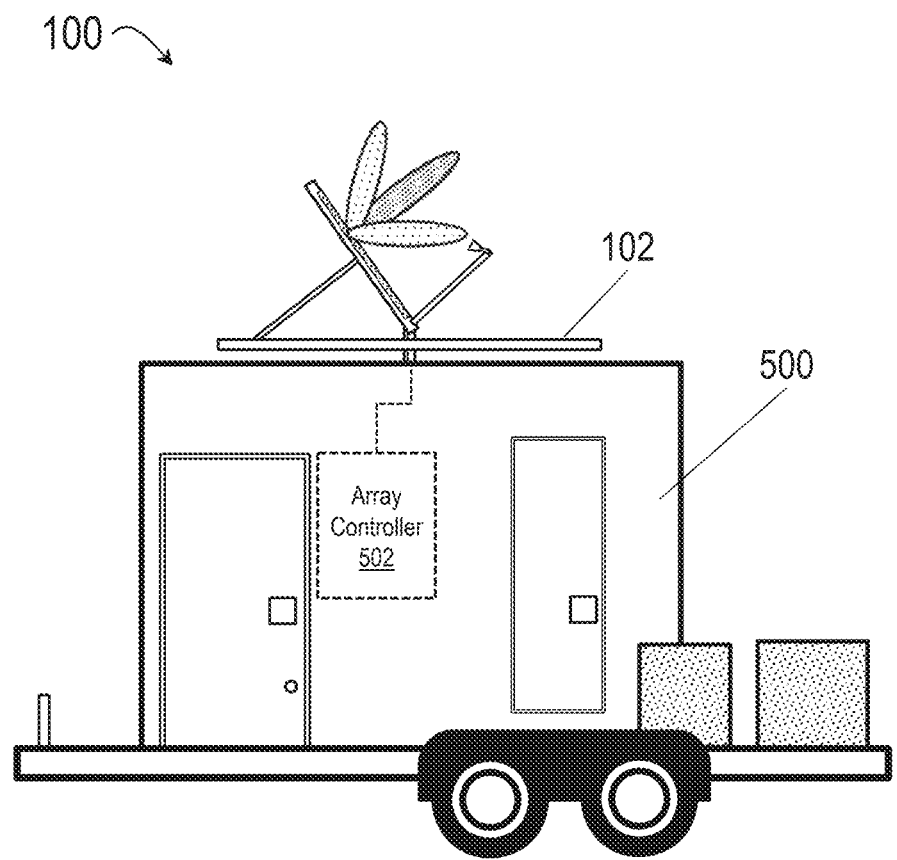
FIG. 5 is a profile view of the satcom terminal apparatus of FIG. 1 mounted to a mobile platform.
Figure 6:
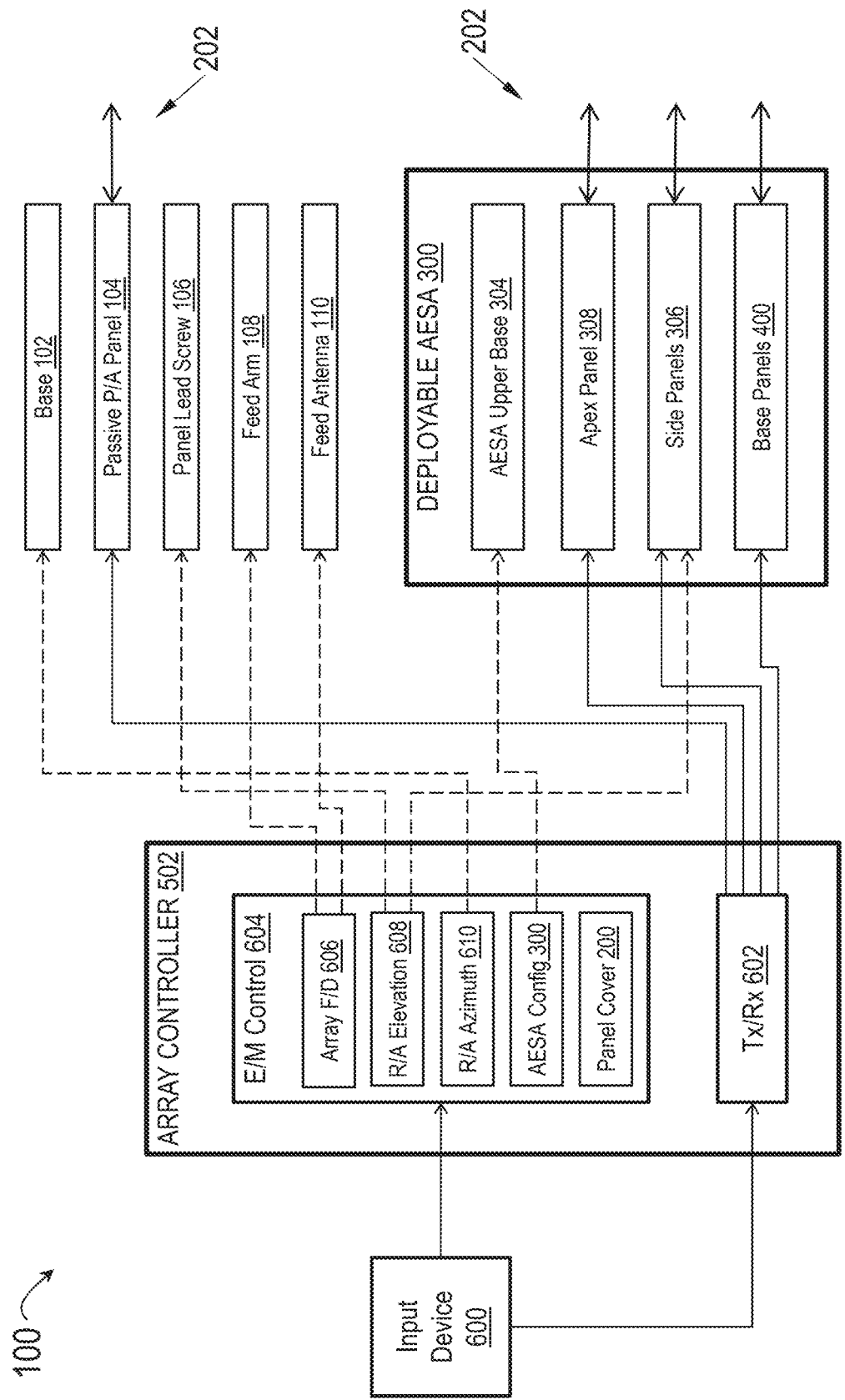
FIG. 6 is a block diagram of the satcom terminal apparatus of FIG. 1.

FIGS. 5 and 6—Mobile Platform and Apparatus Components

Referring now to FIGS. 5 and 6, the satcom terminal apparatus 100 is shown.

In embodiments, referring in particular to FIG. 5, the satcom terminal apparatus 100 may be mounted to (e.g., the platform (112, FIG. 1) may include) a towable trailer 500, ground-based vehicle, warfighter, or other like mobile platform. For example, the satcom terminal apparatus 100 may be mounted atop the trailer 500 by its base 102 and may rotate relative thereto as discussed above. In some embodiments, the trailer 500 may serve as a mobile command center. For example, a user or operator may be stationed inside the trailer 500 where control input may be provided to an array controller 502. In some embodiments, the array controller 502 may include one or more processors and memory or other like data storage, e.g., for receiving, storing, and/or transmitting control input and/or array attributes for use with the satcom terminal apparatus 100. In some embodiments, the satcom terminal apparatus 100 may be transported via the trailer 500 or mobile platform and detached therefrom when the trailer has reached a desired location, e.g., for satcom operations on level ground associated with absolute terrestrial coordinates relative to which the satcom terminal apparatus may be rotated.

In embodiments, referring also to FIG. 6, the satcom terminal apparatus 100 may include an input device 600 via which the operator may provide control input to the array controller 502. For example, the input device 600 may include any or all of, and may not be limited to, a keyboard, touch-sensitive display, and/or any combination of dials, switches, levers, buttons, or other controls capable of transmitting control input to the array controller 502. In some embodiments, the satcom terminal apparatus 100 may be automated for operation according to mission specific preprogrammed control input.

In embodiments, an operator may control or adjust transmission or reception 602 (Tx/Rx) of EM energy (202, FIG. 2) transmitted or received via the passive planar array panel 104 or the deployable AESA 300 (e.g., via the apex AESA panel 308, side AESA panels 306, and/or base AESA panels 400 thereof). For example, the operator may select, via the input device 600, array attributes specific to the planar array panel or to any subarray panel or set of subarray panels of the deployable AESA 300 (e.g., side AESA panels 306, apex AESA panel 308, base AESA panels 400). Selectable array attributes may include, but are not limited to: target frequency; target frequency band or sub-band; and/or signal polarization.

In embodiments, the array controller 502 may also allow the user to adjust (via the input device 600) articulation, retraction, deployment, and/or stowage of any components of the satcom terminal apparatus 100 via electromechanical (E/M) control 604. For example, E/M control 604 may adjust, based on control input, the reflectarray f/d diameter 606, e.g., by electromechanically adjusting the orientation of the feed arm 108 relative to the passive planar array panel 104 and/or the orientation of the feed antenna 110 relative to the feed arm 108. Further, E/M control 604 may adjust the reflectarray elevation 608 by electromechanically adjusting the slant angle of the passive planar array panel 104 relative to the base 102. Further still, E/M control 604 may adjust the reflectarray azimuth 610 by rotating the base 102 relative to the platform (112, FIG. 1; e.g., trailer 500, FIG. 5).

In embodiments, the operator may electromechanically configure the deployable AESA 300 via control input provided to E/M control 604 via the input device 600. For example, the operator may deploy the AESA 300 by electromechanically pivoting the AESA upper base 304 from its retracted configuration (302, FIG. 3) to the stowed configuration. Further, the operator may transition the deployable AESA 300 from the stowed configuration to a deployed configuration by adjusting the side AESA panels 306 to the desired slant angle relative to the upper base 304 (and, by extension, the apex AESA panel 308 to a position atop the truncated pyramid formed by the side AESA panels).

In some embodiments, components of the deployable AESA 300 (e.g., the upper base 304, side AESA panels 306, apex AESA panel/s 308, and/or base AESA panels 400) may comprise a modular set of "snap-together" components (as described in greater detail below). For example, to reduce weight and/or where electromechanical control may not be a priority, the deployable AESA 300 may be assembled on-site from the above modular set of components and attached/connected to the passive planar array panel 104.

Figure 7:
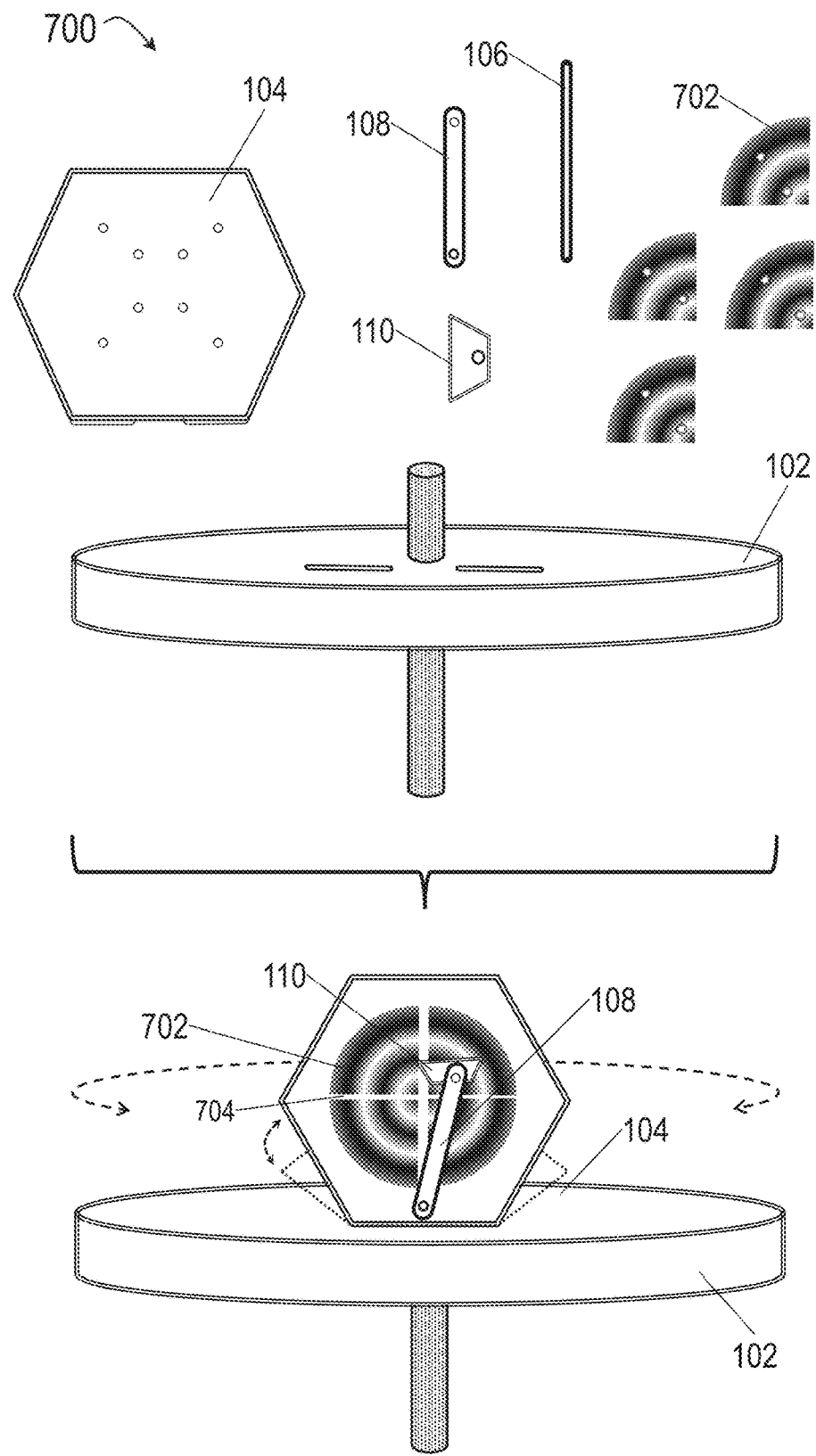
FIG. 7 is an illustration of a planar array assembly and modular components thereof of the satcom terminal apparatus of FIG. 1 configured for manpack/foot soldier use.

FIG. 7—Modular Foot Soldier Configuration

Referring to FIG. 7, in embodiments the satcom terminal apparatus 700 may be implemented and may function similarly to the satcom terminal apparatus 100 of FIGS. 1 through 6, except that the satcom terminal apparatus 700 may be configured for smaller, transportable aperture sizes and for use by a foot soldier remotely located from the trailer (500, FIG. 5) or any other mobile platform 112 or command center. In some embodiments, the satcom terminal apparatus 700 may be configured for transport in and deployment from a backpack by a single foot soldier, without any other mobile platform.

In embodiments, the satcom terminal apparatus 700 may include low-mass, compact subassemblies configured for transportability in a backpack to locations inaccessible to the trailer (500, FIG. 5) or other like mobile platforms. For example, the passive planar array panel 104 may comprise a set of passive reflector subarrays 702 that snap into the planar array panel, e.g., without the need for additional fasteners, via holes, tabs, and/or slots. In embodiments, the apertures or elements of the passive reflector subarrays 702 may be configured for integrated passive time delay for optimal beam focusing. Further, the passive reflector subarrays 702 may be configured for installation or attachment to the passive planar array panel 104 with reasonable inter-subarray gaps 704 (e.g., acceptable for modest side lobe levels associated with GEO satcom operations in the Ku-band (12-16 GHz).

In embodiments, the passive planar array panel 104 and/or passive reflector subarrays 702 may be fashioned of metallized or electroplated plastic, additive manufactured (AM) waveguide (e.g., metallic AM, metallized or metallic-plated AM plastic), or other like low-mass, low-center of gravity material capable of minimizing payload mass to allow rapid beampointing capability when controlled by electromechanical pointing systems (e.g., the array controller (502, FIG. 5)). For example, the passive reflector subarray 702 may incorporate one or more of: printed circuit board (PCB) microstrip antennas, tightly coupled dipole arrays (TCDA), and/or planar ultra wide band (UWB) microstrip antennas (PUMA).

In embodiments, the feed arm 108, feed antenna 110, panel lead screw 106, and/or base 102 may likewise be fashioned of low-mass materials and configured for rapid assembly and disassembly in the field. In some embodiments, the satcom terminal apparatus 700 may be configured for manual beampointing via manual rotation of the base 102 and/or alignment of the passive planar array panel 104, feed arm 108, and/or feed antenna 110.

Broadly speaking, the satcom terminal apparatuses 100, 700 can be readily integrated into the roof of a trailer 500 or other mobile platform, eliminating the need for unpacking a warfighter and assembling a satcom terminal from multiple carrying containers each time satcom operations are required. Rather than 30 to 60 minutes of unpacking and assembly, the satcom terminal apparatus 100, 700 may be deployed within minutes or even seconds while the mobile platform may be used as a mobile command center. In embodiments, COTH or COTP operations may be initiated almost immediately once the trailer 500 or mobile platform is no longer in motion, with limited COTM operations possible in some configurations. Further, the satcom terminal apparatus 100, 700 may be capable of simultaneous operations with multiple satellites and constellations, as well as operations involving multiple GEO, MEO, and/or LEO providers through a single terminal.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A satellite communications (satcom) terminal apparatus, comprising:
    a base rotatably attached to a platform, the base capable of rotation relative to a vertical axis;
    at least one passive planar array panel comprising an array of antenna elements, the passive planar array panel pivotably attached to the base via at least one lead screw and disposed at a slant angle relative to the base via engagement with the lead screw,
    the at least one passive planar array panel including:
        a feed arm rotatably coupled to the passive planar array panel;
        and
        a feed antenna rotatably coupled to the feed arm, the feed antenna configured for transmission and reception of electromagnetic (EM) energy;
    wherein the array of antenna elements is configured to focus the transmitted or received EM energy according to a beam direction;
    and
    an array controller operatively coupled to the at least one passive planar array panel, to the at least one feed antenna, and to the base, the array controller configured to:
        transmit and receive the EM energy;
        and
        adjust the beam direction associated with the passive planar array panel to at least one of a desired azimuth or a desired elevation via electromechanical adjustment of at least one of:
            the slant angle of the passive planar array panel;
            or
            a rotational orientation of the base relative to the platform.

2. The satcom terminal apparatus of claim 1, wherein the array controller is configured to adjust the beam direction via electromechanical adjustment of at least one of:
    an orientation of the at least one feed arm relative to its passive planar array panel;
    or
    an orientation of the at least one feed antenna relative to its feed arm.

3. The satcom terminal apparatus of claim 1, wherein:
    the at least one passive planar array panel is a reflectarray panel including an array of reflectarray elements.

4. The satcom terminal apparatus of claim 1, wherein the array controller is configured for half-duplex transmission and reception of EM energy via the at least one passive planar array panel.

5. The satcom terminal apparatus of claim 1, wherein the array controller is configured for full-duplex transmission and reception of EM energy via the at least one passive planar array panel.

6. The satcom terminal apparatus of claim 1, further comprising:
    at least one protective cover disposed over the at least one passive planar array panel and configured to cover the at least one passive planar array panel when the satcom terminal apparatus is not in use;
    wherein the array controller is configured to electromechanically open and close the at least one protective cover.

7. The satcom terminal apparatus of claim 1, wherein the at least one passive planar array panel is attached to the base at a bottom edge of the passive planar array panel, further comprising:
    an upper base pivotably attached or attachable to the at least one passive planar array panel at a top edge of the passive planar array panel, the top edge opposite the bottom edge;
    and
    an active electronically scanned array (AESA) attached to the upper base, the AESA comprising:
        a plurality of side AESA panels, each side AESA panel slidably attached to the upper base at a bottom edge of the side AESA panel, each side AESA panel including one or more AESA elements operatively coupled to the array controller;
        and
        at least one apex AESA panel pivotably attached to the plurality of side AESA panels, the at least one apex AESA panel including one or more AESA elements operatively coupled to the array controller and having a polygonal shape;
    wherein the at least one apex AESA panel and the plurality of side AESA panels are collectively configured for electronically steerable transmission and reception of EM energy associated with at least one array attribute selected from a group including a target frequency, a target frequency band, and a target polarization;
    wherein the AESA has a retracted configuration, a stowed configuration, and a deployed configuration,
        the retracted configuration corresponding to an arrangement of the upper base, the plurality of side AESA panels, and the at least one apex AESA panel coplanar with and adjacent to a rear face of the passive planar array panel,
        the stowed configuration corresponding to an arrangement of the plurality of side AESA panels coplanar with the at least one apex AESA panel and with the upper base,
        and
        the deployed configuration corresponding to an arrangement of the plurality of side AESA panels in a truncated pyramid wherein each side AESA panel is inclined at a slant angle to the upper base; and
    wherein the array controller is configured for selection and adjustment of the at least one array attribute.

8. The satcom terminal apparatus of claim 7, wherein the array controller is configured for:
    selection of the slant angle;
    selection of the target frequency, target frequency band, or target polarization;
    and electromechanical transitioning of the AESA between the retracted, stowed, and deployed configurations.

9. The satcom terminal apparatus of claim 7, wherein each side AESA panel is adjustable to a common slant angle.

10. The satcom terminal apparatus of claim 7, wherein the at least one apex AESA panel comprises a plurality of panel segments pivotably attached to a central lead screw;
wherein the plurality of panel segments is configurable as a pyramid by rotating the lead screw in a first direction; and
wherein the plurality of panel segments is configurable as an inverted pyramid by rotating the lead screw in a second direction opposite the first direction.

11. The satcom terminal apparatus of claim 10, wherein the array controller is configured for electromechanical reconfiguration of the plurality of panel segments.

12. The satcom terminal apparatus of claim 7, wherein the AESA further comprises:
a plurality of base AESA panels fixed to the upper base and operatively coupled to the array controller, each base AESA panel disposed between two adjacent AESA side panels;
and
wherein the plurality of base AESA panels is collectively configured for electronically steerable transmission and reception of EM energy associated with the at least one array attribute.

13. The satcom terminal apparatus of claim 12, wherein the upper base includes a gap between each AESA base panel and the two adjacent AESA side panels.

14. The satcom terminal apparatus of claim 7, wherein:
the AESA is configured to pivot between the retracted configuration and the stowed configuration according to a pivot axis;
and
the AESA is configured for rotation according to a roll axis, the roll axis normal to the pivot axis.

15. The satcom terminal apparatus of claim 1, wherein the platform is a mobile platform selected from a group including a ground-based vehicle, and a towable trailer.

16. The satcom terminal apparatus of claim 15, wherein the satcom terminal apparatus is detachable from the mobile platform;
and
wherein the passive planar array panel and the array controller are configured for operation when the satcom terminal apparatus is in the detached state.

17. The satcom terminal apparatus of claim 1, wherein:
the satcom terminal apparatus is carried by the operator in a backpack and deployable by the operator when removed from the backpack;
and
wherein the array controller is configured to accept control input from the operator.

18. The satcom terminal apparatus of claim 17, wherein:
the at least one passive planar array panel, the at least one feed arm, the at least one feed antenna, and the base are configured for assembly and disassembly by the operator.

19. The satcom terminal apparatus of claim 1, comprising:
at least one planar superstrate comprising one or more dielectric ballistic materials configured for protection of the satcom terminal apparatus, the at least one dielectric ballistic material applied to one or more of:
at least one antenna element of the passive planar array panel;
the at least one feed arm;
or
the at least one feed antenna.

* * * * *